(12) United States Patent
Cain et al.

(10) Patent No.: US 9,698,628 B2
(45) Date of Patent: Jul. 4, 2017

(54) SYSTEM INTEGRATION OF WIRELESS POWER TRANSMISSION SUBSYSTEM

(75) Inventors: Gamil A. Cain, El Dorado Hills, CA (US); Jim Walsh, Santa Clara, CA (US)

(73) Assignee: INTEL CORPORATION, Santa Clara, CA (US)

(*) Notice: Subject to any disclaimer, the term of this patent is extended or adjusted under 35 U.S.C. 154(b) by 679 days.

(21) Appl. No.: 13/325,952

(22) Filed: Dec. 14, 2011

(65) Prior Publication Data

US 2013/0154381 A1    Jun. 20, 2013

(51) Int. Cl.
| | |
|---|---|
| *G06F 1/00* | (2006.01) |
| *H02J 17/00* | (2006.01) |
| *G06F 1/26* | (2006.01) |
| *G06F 1/32* | (2006.01) |

(52) U.S. Cl.
CPC .............. *H02J 17/00* (2013.01); *G06F 1/26* (2013.01); *G06F 1/3203* (2013.01)

(58) Field of Classification Search
CPC ................................. G06F 1/3203; G06F 1/26
USPC .......................................................... 713/300
See application file for complete search history.

(56) References Cited

U.S. PATENT DOCUMENTS

| | | | |
|---|---|---|---|
| 2006/0184705 A1* | 8/2006 | Nakajima | 710/303 |
| 2007/0260337 A1* | 11/2007 | Sugiyama | 700/40 |
| 2009/0251008 A1* | 10/2009 | Sugaya | 307/104 |
| 2010/0213895 A1* | 8/2010 | Keating et al. | 320/108 |
| 2011/0241607 A1* | 10/2011 | Wiegers | H02J 7/025 320/108 |
| 2012/0091950 A1* | 4/2012 | Campanella | H02J 5/005 320/108 |
| 2012/0173418 A1* | 7/2012 | Beardsmore | G06Q 30/06 705/40 |

* cited by examiner

*Primary Examiner* — Jaweed A Abbaszadeh
*Assistant Examiner* — Austin Hicks
(74) *Attorney, Agent, or Firm* — Pillsbury Winthrop Shaw Pittman LLP (57) ABSTRACT

In accordance with various aspects of the disclosure, systems, methods, and devices are disclosed that include a power source integrated with a host computing device, and configured to provide power to the host computing device, and a wireless power transmission module coupled to the host computing device. The wireless power transmission module is configured to wirelessly transmit power derived from the power source independent of whether the host computing device is in a powered-off state or not. The host computing device may be configured to stop the wireless power transmission based on a determination that at least one of one or more predetermined transmission policies has been violated or that an unrecoverable error has occurred at the host computing device.

30 Claims, 5 Drawing Sheets

SYSTEM INTEGRATION OF WIRELESS POWER TRANSMISSION SUBSYSTEM

BACKGROUND

This disclosure relates generally to the field of power transmission, and in particular, to management of power supply for wireless power transmission.

Recent advances in wireless power/energy transfer systems, especially resonance-based technologies, have made the wireless transfer of power more efficient over longer distances. Typically, in wireless power systems, a power transmitting device or apparatus (or in general, a "transmitter") receives power directly from an alternating current (AC) power source. However, such wireless power transmitters are not integrated with other computing devices to receive power from the computing devices' own power supplies (e.g., batteries).

DETAILED DESCRIPTION

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, a system is presented that includes a power source that is integrated with a host computing device and configured to provide power to the host computing device, and a wireless power transmission module that is coupled to the host computing device and configured to wirelessly transmit power derived from the power source independent of whether the host computing device is in a powered-off state or not.

In accordance with other embodiments of this disclosure, a computing device is presented that includes a processor, a power source configured to provide power to one or more components of the device, and a wireless power transmission module operatively coupled to the processor and the power source, and that is configured to wirelessly transmit power derived from the power source independent of whether the power source is providing power to the one or more components of the device or not.

In accordance with various embodiments of this disclosure, an apparatus is presented that includes an antenna configured to generate an electromagnetic field to transmit power wirelessly, a power reception module adapted to be coupled with a power source of a computing device, and receive power therefrom independent of whether the computing device is in a powered-off state or not, and a power processing module configured to process the received power and energize the antenna in accordance with the processed power.

In accordance with various embodiments of this disclosure, a method is presented that includes receiving power from a power source of a computing device at a wireless power transmission module operatively associated to the computing device, and wirelessly transmitting power from the wireless power transmission module. The power from the power source may be received at the wireless power transmission module independent of whether the computing device is in a powered-off state or not.

In accordance with various embodiments of this disclosure, a method is presented that includes providing, at a computing device including a power source, a power interface at which a wireless power transmission module is connected, wherein the wireless power transmission module is configured to wirelessly transmit power, and providing power from the power source of the computing device to the wireless power transmission module connected at the power interface independent of whether the power source is providing power to any component of the computing device or not.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Figure 1:
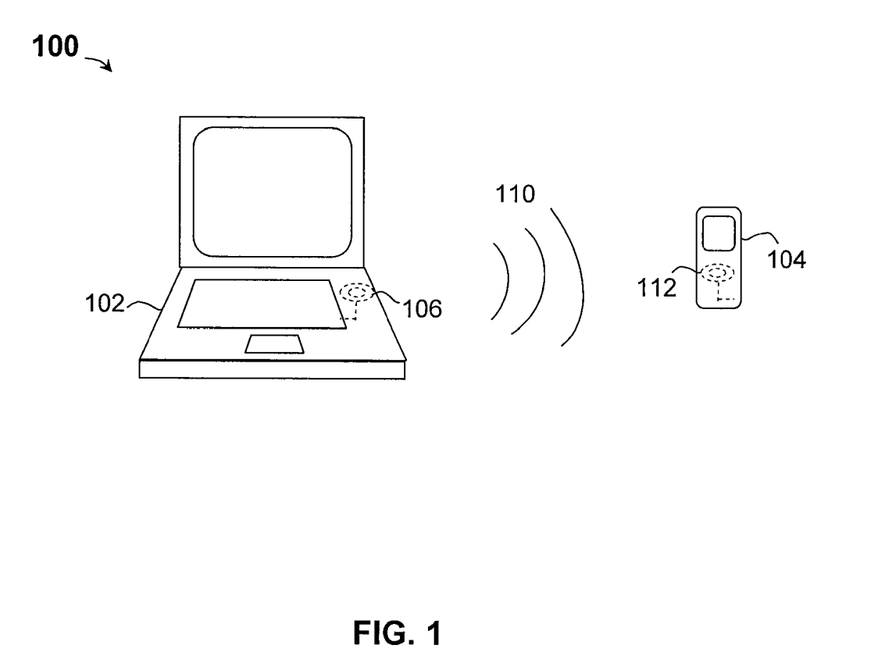
FIG. 1 depicts shows an exemplary system concept diagram of wireless power transmission system, in accordance with various aspects of the present disclosure.

Turning now to the various aspects of the disclosure, FIG. 1 depicts an exemplary diagram representing wireless transmission environment 100, in accordance with various exemplary embodiments of the present disclosure. A wireless transmitting source, such as, for example, wireless host computing device 102, transmits power to a wireless receiving destination, such as, for example, wireless receiving device 104. The transmitted power is wirelessly conveyed via an electromagnetic field generated by transmitter antenna 106, represented by arcuate curves 110 in FIG. 1, that is received by receiver antenna 112. In one embodiment, wireless host computing device 102 and wireless receiving device 104 are configured to have a mutually compatible resonant relationship, namely, the resonant frequency of wireless receiving device 104 corresponds to the resonant frequency of wireless host computing device 102.

By way of illustration only, and in no way limiting, wireless host computing device 102 is represented as a laptop and wireless receiving device 104 is illustrated as a cellular phone. However, as can be contemplated by one of ordinary skill in the art after reading this disclosure, wireless host computing device 102 may be a desktop personal computer (PC), a mobile computing device (e.g., a smart-phone with computing capabilities, a tablet computer), or any computing device (e.g., a system or module installed in a vehicle with (audio and/or video) data computing functionalities), with a wireless power transmission or charging device (internally or externally) integrated therewith. Further, wireless receiving device 104 may be a computing devices (e.g., a personal digital assistant or PDA device), a mobile computing device (e.g., a smart-phone with computing capabilities, a tablet computer), or other device/appliance configured with wireless power reception capabilities. In some embodiments, the wireless power transmission or charging module coupled with wireless host computing device 102 include a charging mat upon which a device to be charged, e.g., wireless receiving device 104, is placed for wireless power transfer.

It will also be appreciated that, although one wireless host computing device 102 and one wireless receiving device 104 are shown in environment 100 of FIG. 1, various aspects of the disclosure can relate to other number of wireless host computing devices and receiving devices, as can be contemplated by one of ordinary skill in the art after reading this disclosure. For example, environment 100 may have one wireless host computing device transmitting power to two or more wireless receiving devices. Alternatively, a network of plurality of wireless host computing devices and wireless receiving devices may be used in environment 100 for the wireless transmission and reception of power, such that each of the wireless host computing devices and receiving devices may be a node in such a network system.

Figure 2:
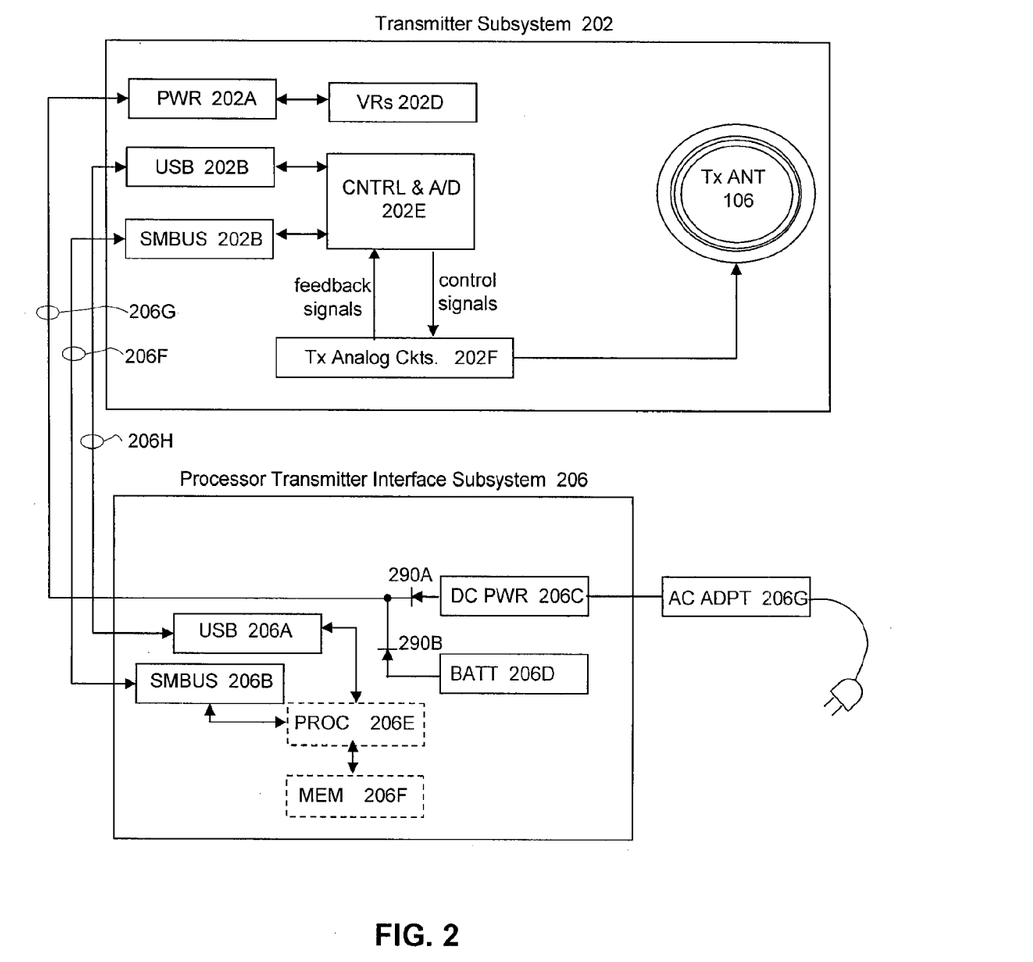
FIG. 2 depicts a functional block diagram of a transmitter subsystem and a processor transmitter interface subsystem, in accordance with various aspects of the present disclosure.

FIG. 2 depicts a functional block diagram of an exemplary transmitter subsystem 202 and processor transmitter interface subsystem 206 of wireless host computing device 102, in accordance with various exemplary embodiments of the present disclosure. In some embodiments, wireless host computing device 102 includes, among other components, both transmitter subsystem 202 and processor transmitter interface subsystem 206 in a single unit. In alternative embodiments, wireless host computing device 102 only includes, among other components, processor transmitter interface subsystem 206, and transmitter subsystem 202 is external to and coupled with wireless host computing device 102 (and therefore, with subsystem 206) via appropriate connections, as discussed below.

The processor transmitter interface subsystem 206 may be initially configured by processor or controller 206E of wireless host computing device 102, and subsystem 206 (or controller 206E) may control or define configuration of various transmitting parameters of transmitter subsystem 202, e.g., based upon one or more transmission policies. Such transmission policies may be provided through a user interface, e.g., a graphical user interface of configuration software associated with host computing device 102, a web page adapted to communicate user-provided data to host computing device, a command line interface on host computing device 102, and/or other user interfaces. The transmission policies may be stored in memory 206F of host computing device 102, and may include operating rules, such as, only transmit power when AC power is present, only transmit power when battery is engaged, limit transmit power based on heat detection, terminate power transmission when detected remaining battery power is below a predetermined power threshold, terminate power transmission when a time duration during which the wireless power transmission is kept maintained or kept active exceeds a predetermined time threshold, one or more specific time instants when the wireless power transmission is activated, an amount of power to be wirelessly transmitted by transmitter subsystem 202, and other policies. Once configured (e.g., subsystem 206 or controller 206E), transmitter subsystem 202 may function autonomously and is not dependent on other software or hardware to transmit power.

Processor 206E may be one or more microprocessors or microcontrollers such as those made by Intel Corporation of Santa Clara, Calif. (although other vendors may be used). In one example, processor 206E may form a compute complex on a circuit board and may include one or more microprocessor units, or any other combination of logic circuits capable of executing the functionality and methodologies of wireless host computing device 102 as described herein below.

Memory 206F coupled to processor 206E may be one or more of the following types of memory: SRAM; BSRAM; or EDRAM. Other examples include the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing functionality and methodologies described herein below.

Communication between processor transmitter interface subsystem 206 and transmitter subsystem 202 is achieved via a bus infrastructure. In one embodiment, processor transmitter interface subsystem 206 delivers configuration, control, status, and power-related information to transmitter subsystem 202 through bus infrastructure comprising buses 206F, 206G, and 206H. That is, bus 206H (e.g., Universal Serial Bus (USB)) may be configured to convey configuration and control information and bus 206F (e.g., System Management (SM) Bus) may be configured to exchange battery and charging status information between controller 202E of transmitter subsystem 202 and controller 206E, while bus 206G may be configured to supply power to transmitter subsystem 202. Although various bus configurations have been described, it should be understood that other types of serial or parallel buses known to one of ordinary skill in the art may be used. Further, in some embodiments, communication between processor transmitter interface subsystem 206 and transmitter subsystem 202 is achieved via a compatible network interface which is installed and configured on both subsystem 202 and subsystem 206. For example, in a relatively large room, one or more wireless transmitter subsystems 202 (i.e., wireless power charging stations) may be configured to be controlled by (and in communication with) one or more subsystems 206 (or controllers 206E thereof) over a local area network (IAN). In this scenario, subsystems 202, 206 may include appropriate LAN interfaces (and power sources) to establish communication therebetween.

Because wireless host computing device 102 may, itself, be powered by an external source or battery, processor transmitter interface subsystem 206 includes power coupler 206C as well as battery 206D. Power coupler 206C receives a regulated DC voltage signal from AC adapter 206G that connects to an external AC power supply. It will be appreciated that AC adapter 206G may include transformer circuits, rectifying circuits, and other circuitry to ensure a proper DC voltage signal level, as can be contemplated by one of ordinary skill in the art. In general, the combination of power coupler 206C and battery 206D may be treated as a power source for host computing device 102 providing power to one or more components of device 102.

The DC voltage signal, from either power coupler 206C or battery 206D is supplied to transmitter subsystem 202 via bus 206G to power coupler 202A. The DC voltage signal is then regulated by voltage regulator(s) 202D of transmitter subsystem 202 to account for any variations due to coupling and battery output voltage, and ensure a constant DC voltage signal level.

As noted above, controller 202E of transmitter subsystem 202 is configured to exchange configuration, control information, and status information via buses 206F, 206H with subsystem 206. Further, controller 202E may also be configured to provide control signals to, and receive feedback signals from, transmit analog circuitry 202F. Controller 202E may be one or more microprocessors or microcontrollers such as those made by Intel Corporation of Santa Clara, Calif. (although other vendors may be used). Transmit analog circuitry 202F, described in more detail below, operates to energize transmit antenna 106 in accordance with the control signals provided by controller 202E.

Figure 3:
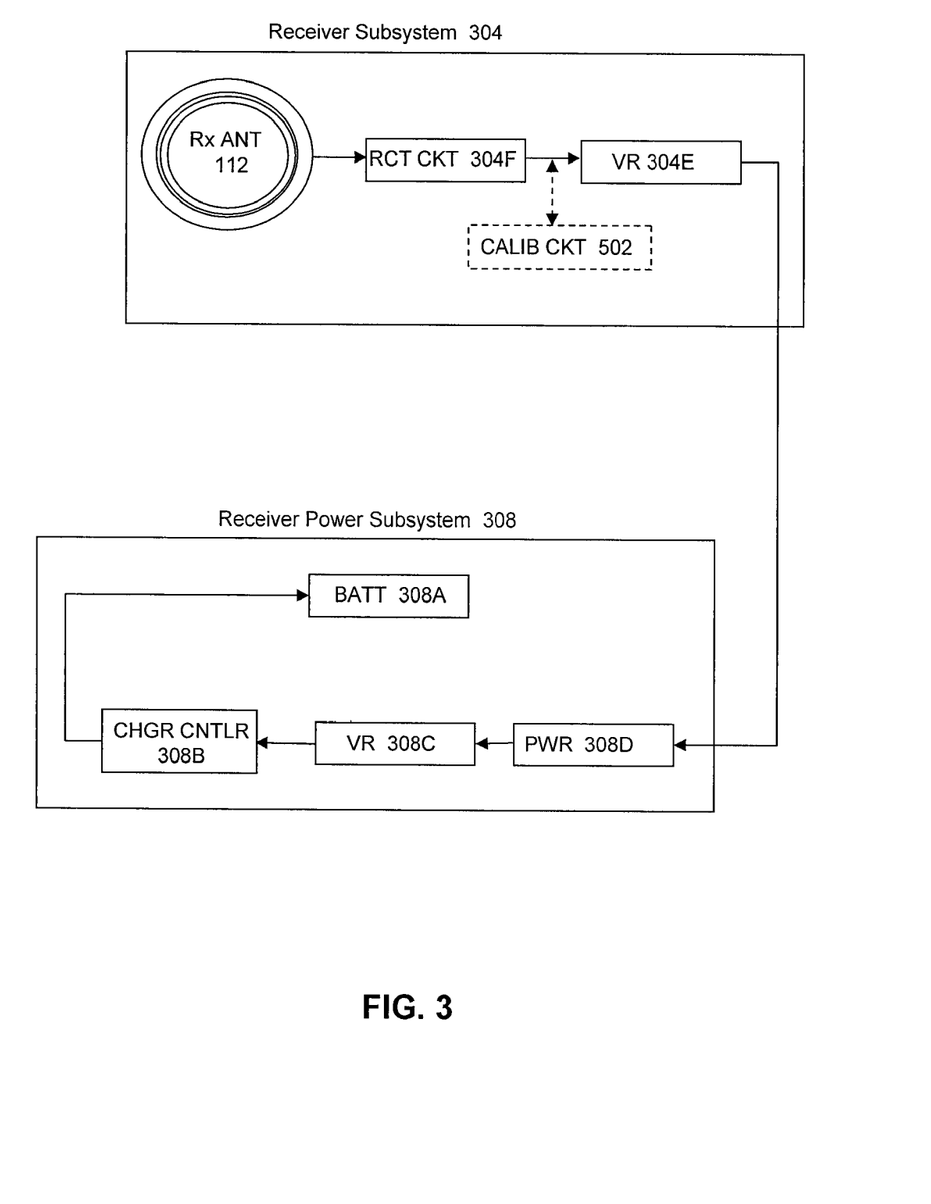
FIG. 3 depicts a functional block diagram of a receiver subsystem and receiver power subsystem, in accordance with various aspects of the present disclosure.

Turning to the receiving side, FIG. 3 depicts a functional block diagram of an exemplary receiver subsystem 304 and receiver power subsystem 308 of wireless receiving device 104, in accordance with various exemplary embodiments of the present disclosure. The transmitted power wirelessly conveyed by transmitter antenna 106, via field 110, is received by receiver antenna 112 of subsystem 304. As with transmitter antenna 106, receiver antenna 112 may comprise one or more of a coil antenna, helical antenna, a dipole antenna, a monopole antenna, a loop antenna, a patch antenna, a slot antenna, a Planar Inverted "F" (FIFA) antenna, and other types of antennas of suitable geometry and electrical properties depending upon specific transmission parameters associated with the power reception by wireless receiving device 104.

Receiver antenna 112 is coupled to a rectifier circuit 304F that converts the received energy into a DC voltage signal. Rectifier circuit 304A may comprise a full wave rectifying circuit, such as, for example, a bridge rectifier, or other circuitry suitable for such purposes. The DC voltage signal is then regulated by voltage regulator 304E to provide a regulated and constant DC voltage signal level.

The regulated DC voltage signal is provided to receiver power subsystem 308 via power coupler 308D and is then regulated again by voltage regulator 308C to account for any variations due to coupling and ensure a constant DC voltage signal level. The constant DC voltage signal is then provided to a charger controller 308B to control the charging voltage supplied to battery 308A. The charger controller 308B may comprise a processor, DC/DC converter(s), timing circuit(s), trickle charge circuit(s), protection circuit(s), and other circuitry to ensure the proper charging of battery 308A, as can be contemplated by one of ordinary skill in the art after reading this disclosure.

Receiver subsystem 304 may further include a timer and switch calibration circuit 502. In some embodiments, for the wireless host computing device 102 to adequately detect the presence and range of wireless receiving device 104 and ameliorate introductory nonlinear variances caused by voltage regulator 304E, timer and switch calibration circuit 502 operates to present a predetermined fixed resistive load during an initial calibration time interval. Since the transmit power level and receive fixed load is known for this time interval, the presence of wireless receiving device 104 and the spatial distance between the receiving device 104 and wireless host computing device 102 can be determined.

Figure 4:
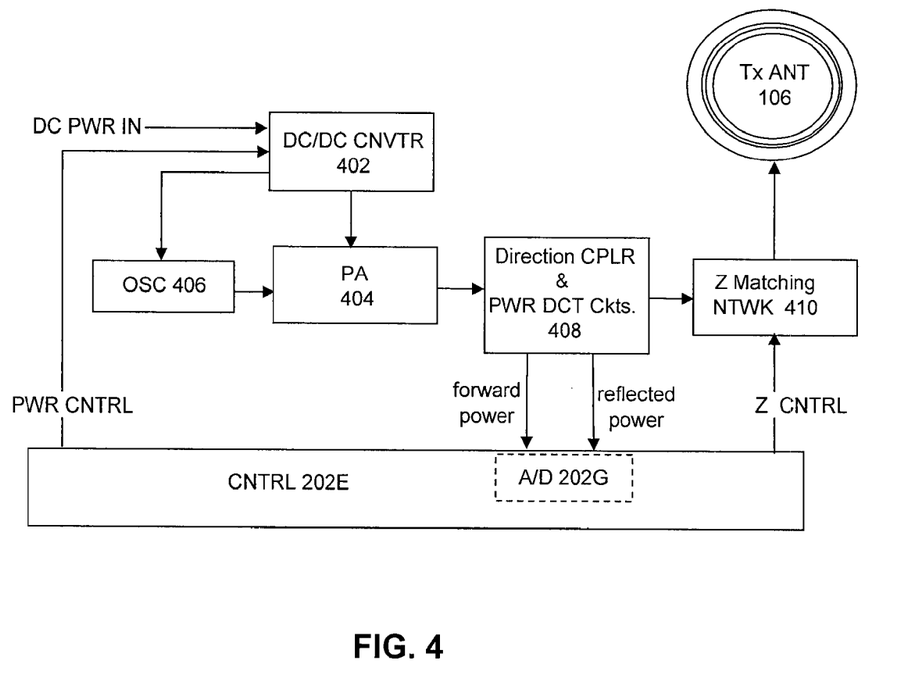
FIG. 4 depicts a functional block diagram of transmitter analog circuitry, in accordance with various aspects of the present disclosure.

As noted above, transmit analog circuitry 202F of transmitter subsystem 202 operates to energize transmit antenna 106 in accordance with control signals provided by controller 202E. FIG. 4 depicts a detailed functional block diagram of transmit analog circuitry 202F. In accordance with various embodiments of the present disclosure, transmit analog circuitry 202F comprises DC/DC converter circuitry 402, power amplifier 404, oscillating circuit 406, directional coupler and power detection circuitry 408, and impedance matching circuitry 410.

The DC/DC converter circuitry 402 provides a DC voltage signal at a constant or stable voltage level (e.g., 5 volts) to oscillator 406, and provides a DC signal with variable voltage (in accordance with control signals generated by controller 202E) to power amplifier 404. The DC voltage drives both oscillator 406 and power amplifier 404. For example, based on the inputted DC voltage, oscillator 406 generates a radio-frequency (RF) signal operating at a predetermined RF frequency (e.g., 13.5 MHz), while power amplifier 404 adjusts (e.g., steps up) the power level of the radio-frequency (RF) signal in accordance with the variable voltage of the received DC signal (e.g., to a maximum predetermined amount (e.g., 15 W)).

In turn, power amplifier 404 inputs a power signal to directional power coupler and power detector circuitry 408. It will be appreciated that transmit power is a function of power conveyed in a forward direction (i.e., forward power) from the transmission source and power reflected back (i.e., reflected power) towards the transmission source due to impedance mismatches. As such, the power directional coupler portion of circuitry 408 separates the power signal into a forward power signal and a reflected power signal. The power detector portion of circuitry 408 detects the levels of separated forward power and reflected power signals and converts the detected levels of forward power and reflected power into voltage signals. These voltage signals are supplied to A/D converter(s) 202G to generate DC voltage information representative of the forward power and reflected power levels to be processed by controller 202E.

Armed with the voltage information representing the forward power and reflected power levels, controller 202E functions to adjust and control the output power of power amplifier 404 by changing the operating voltage of the power amplifier 404 via a power control signal provided to DC/DC converter 402. Controller 202E also functions to adjust and control the tuning of impedance matching network 410 via an impedance control signal provided to impedance matching network 410. In one embodiment, controller 202E adjusts the output power transmitted as well as tunes the impedance, based on the detected level of reflected power. That is, controller 202E exploits the reflected power levels to estimate what current load is being drawn by wireless receiving device 104. For example, the current load being drawn by receiving device 104 indicates a certain load impedance, and controller 202E operates to adjust power amplifier 404 and impedance matching network 410 accordingly.

In operation, transmitter subsystem 202 draws or receives power from subsystem 206, e.g., from either power coupler 206C (connected to AC adapter 206G) or battery 206D, independent of whether host computing device (or subsystem 206) is in a powered-off state or not. For example, transmitter subsystem 202 may be configured to derive power from the power source of subsystem 206, when host computing device 102 (and therefore, subsystem 206) is in a powered-on state, i.e., when one or more components of subsystem 206 are being provided power to from the power source to perform their respective functions. For example, if host computing device is an Advanced Configuration and Power Interface (ACPI)-compliant device, the powered-on state corresponds to the "S0" power state defined in the ACPI specification, revision 4.0a, published Apr. 5, 2010 (hereinafter, "ACPI specification"). Further, transmitter subsystem 202 may be configured to derive power from the power source of subsystem 206, when host computing device 102 is in suspend state, e.g., corresponding to "S1," "S2," "S3," and "S4" power states of the ACPI specification, or when host computing device 102 is in a powered-off state, e.g., corresponding to the "S5" power state of the ACPI specification.

Figure 5:
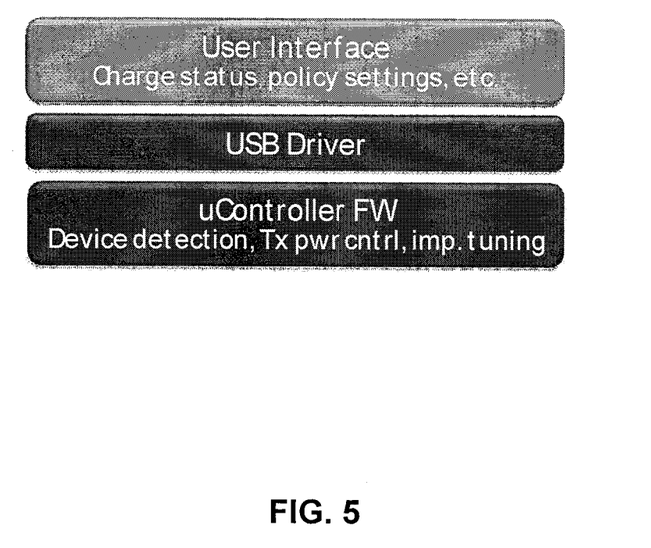
FIG. 5 depicts a block diagram of software associated with a transmitter subsystem and a processor transmitter interface subsystem, in accordance with various aspects of the present disclosure.

In some embodiments, when transmitter subsystem 202 is deriving power from the power source of host computing device 102, while host computing device 102 (and therefore, subsystem 206) is functioning while in the suspend or powered-off state (e.g., ACPI S3, S4, or S5 state) and only connected to its associated battery (e.g., battery 206D), power transmission from transmitter subsystem 202 may be adjusted or terminated based, e.g., on a current energy level of the battery. For example, controller 206E may be configured to monitor battery energy level of battery 206D, and also whether subsystem 206 or host computing device 102 is connected to an active AC power source, e.g., via AC adapter 206G. Controller 206E may be configured or programmed to monitor the battery level against one or more predetermined policies, e.g., stored in memory 206F. Such predetermined policies may include, but not limited to, a first threshold for the remaining battery level below which the amount of power provided from battery 206D to transmitter subsystem 202 and/or the power transmitted by transmitter subsystem 202 has to be minimized or terminated, and a second threshold for the amount for time period for which the power is transferred from battery 206D to transmitter subsystem 202 and/or the power is transmitted by transmitter subsystem 202. In some embodiments, host computing device 102 may include software stack (as illustrated in FIG. 5) including a graphical user interface using which a user may set one or more power transmission policies discussed above. The policies may then be communicated to firmware of controller 206E and/or controller 202E via a USB driver.

In some embodiments, if controller 206E determines that at least one of the one or more predetermined transmission policies has been violated (e.g., battery level is below the first threshold and/or the power transmission time period is above the second threshold), controller 206E is configured to send a signal to transmitter subsystem 202, e.g., to controller 202E via 206F, to affect or adjust (e.g., terminate) the wireless power transmission from subsystem 202. Transmitter subsystem 202 (or controller 202E) may be configured to send a feedback signal to controller 206E informing whether the wireless power transmission has been disabled or not. In alternative embodiments, if controller 206E determines that one at least one of the one or more predetermined transmission policies has been violated, to adjust (e.g., terminate) the power transmission from subsystem 202, controller 206E may be configured to change a state of the USB connection via bus 206H between subsystem 202 and subsystem 206. For example, controller 206E may be configured to control $V_{bus}$ signal of USB bus 206H in accordance with chapter 7.1.5 "Device Speed Identification" of the USB Specification. In this embodiment, to indicate that transmitter subsystem 202 should terminate power transmission, controller 206E removes any signal from, i.e., does not provide any signal on the $V_{bus}$ connection of USB bus 206E. As such, controller 202E of subsystem 202 may also be configured to sense or monitor the presence of a signal on the $V_{bus}$ connection of USB bus 206E, and if no signal is detected, controller 202E configures subsystem 202 to terminate power transmission therefrom.

In some embodiments, controller 202E itself monitors battery energy level of battery 206D (e.g., in the S0 operational state) and/or (periodically) polls, i.e., sends status query signals to, controller 206E for current battery energy level of battery 206D, whether subsystem 206 (and therefore, computing device 102) is connected to an active AC power source (via AC adapter 206G), or both. In such cases, controller 202E may monitor battery/power status of subsystem 206 with respect to one or more predetermined policies discussed above, and may adjust (e.g., terminate or minimize) wireless power transmission from subsystem 202 when at least one of predetermined policies is violated.

In some embodiments, apart from, or in addition to, adjusting power transmission based on predetermined policies, controller 206E is configured to adjust (e.g., terminate) power transmission from subsystem 202 when an unrecoverable error occurs at host computing device 102. For example, in a scenario when one or more components of subsystem 206 stop responding to user input, the user may power off host computing device 102 by holding down the power button for, e.g., 5 seconds. In this case, the power transmission should be terminated. To accomplish this, controller 206E sends a signal (e.g., via bus 206F or via USB bus 206H) to controller 202E to terminate the power transmission. Appropriate hardware components (which will be apparent to one or ordinary skill in the art) may be added in host computing device 102 to shut off VBUS under situations like this, for example the EC (which is normally capable of detecting situations like this) controls the specific VBUS wire going to the platform transmitter and shuts off $V_{bus}$ connection of USB bus 206E under such unrecoverable-error situations, e.g., by powering off a power FET or diode used to turn on or off the $V_{bus}$ connection.

In some embodiments, appropriate adjustments are made to accommodate substantial power draw from the host computing device's power supply to provide power to transmitter subsystem 202. For example, the amount of power that can be drawn from host computing device 102 power sources (e.g., battery 206D and DC power source 206C) may be increased. Such power capacity increase may be achieved by increasing the current carrying capacity of the entire current path, e.g., the current carrying capacity of diodes 290A and 290B. This may also involve increasing the power output of AC adapter 206G by an amount equal to the maximum power that transmitter subsystem 202 may draw, in order to avoid the possibility of overloading the AC adapter 206G's capacity.

In some embodiments, the total power drawn by subsystem 202 and consumed by subsystem 206 is limited such the total power is within the maximum power limit of AC adapter 206G. The amount of power drawn by transmitter subsystem 202 may be limited as a function of power consumed by subsystem 206 of host computing device 102, and the consumed power of subsystem 206 may be limited using techniques well known to a person of ordinary skill in the art, e.g., limiting performance by forcing a lower power CPU P-state, limiting power draw of a specific subsystem such as disabling a DVD drive, etc. Transmitter subsystem 202 power draw is then limited by limiting maximum power amplifier transmit power level such that the total maximum power draw of the sum of the subsystem 202 and subsystem 206 is below the AC adapter 206G's capacity.

In some embodiments, machine-readable instructions comprising one or more algorithms based on above-discussed power management functions, operations and methods performed at subsystem 202 and subsystem 206 may be provided for execution by: (a) a processor, (b) a controller (e.g., controller 202E or 206E), and/or (c) one or more other suitable processing device(s) within, or operatively associated with subsystem 202 or subsystem 206 (or both). The algorithms may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like). For example, at least some of the components of the transmitter and receiver could be implemented by software, hardware, and/or firmware, a combination(s) thereof. Also, some portions of the machine-readable instructions represented by the above-discussed power management processes may be implemented manually at subsystem 202 and/or subsystem 206, for example, using a command line interface (CLI) prompt window operated by a user.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. It is to be noted that although transmitted power is being described here, both power and/or energy can be transmitted and received. These alterations, improvements, and modifications are intended to be suggested by this disclosure, and are within the spirit and scope of the exemplary aspects of this disclosure. Additionally, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

What is claimed is:

1. A system, comprising:
    a power source integrated with a host computing device, and configured to provide power to the host computing device;
    a wireless power transmission module, coupled to the host computing device, configured to wirelessly transmit power derived from the power source, wherein the wireless power transmission module is to derive power from the power source during a plurality of operational states of the host computing device including a powered-off state; and
    a controller to control power transmission by the wireless power transmission module including terminate active power transmission by the wireless power transmission module when a time duration during which the wireless power transmission module is kept active exceeds a time duration threshold, and terminate active power transmission by the wireless power transmission module when a remaining power level of the power source is below a power level threshold, wherein, to terminate active power transmission, the controller is to determine whether or not a control signal is detected on a Universal Serial Bus connection between the wireless power transmission module and the host computing device.

2. The system of claim 1, wherein the host computing device is a personal computer, or a mobile computing device.

3. The system of claim 1, wherein the power source is coupled to an alternating current (AC) power source or a direct current (DC) power source.

4. The system of claim 1, wherein the host computing device is configured to stop the wireless power transmission from the wireless power transmission module.

5. The system of claim 4, wherein the wireless power transmission module is configured to wirelessly transmit power based upon one or more predetermined transmission policies.

6. The system of claim 5, wherein the one or more predetermined transmission policies are provided through a user interface associated with the host computing device, and stored in a memory associated with the host computing device.

7. The system of claim 5, wherein the one or more predetermined transmission policies include a first threshold for a remaining energy level at the power source to maintain the wireless power transmission, a second threshold related to a time duration for keeping the wireless power transmission module activated, an activation time instant of the wireless power transmission module, and an amount of power to be transmitted by the wireless power transmission module.

8. The system of claim 7, wherein the host computing device is configured to stop the wireless power transmission based on a determination that at least one of the one or more predetermined transmission policies has been violated.

9. The system of claim 4, wherein the host computing device is configured to stop the wireless power transmission based on a determination that an unrecoverable error occurred at the host computing device.

10. The system of claim 1, wherein the wireless power transmission module is further configured to monitor an energy level of the power source.

11. The system of claim 1, wherein the wireless power transmission module is further configured to periodically poll the host computing device to determine a current energy level of the power source, whether the power source is coupled to an AC power source, or both.

12. The system of claim 1, wherein a total amount of power provided by the power source is configured in accordance with a maximum amount of power drawn by the wireless power transmission module.

13. A device, comprising:
    a processor;

a power source configured to provide power to one or more components of the device; and a wireless power transmission module configured to wirelessly transmit power derived from the power source, wherein the wireless power transmission module is to derive power from the power source during a plurality of operational states of the device including a powered-off state, wherein the processor is to control power transmission by the wireless power transmission module including terminate active power transmission by the wireless power transmission module when a time duration during which the wireless power transmission module is kept active exceeds a time duration threshold, and terminate active power transmission by the wireless power transmission module when a remaining power level of the power source is below a power level threshold, wherein, to terminate active power transmission, the processor is to determine whether or not a control signal is detected on a Universal Serial Bus connection of the device.

14. The device of claim 13, wherein the power source is coupled to an alternating current (AC) power source or a direct current (DC) power source.

15. The device of claim 13, wherein the device is a personal computer or a mobile computing device.

16. The device of claim 13, wherein the processor is configured to stop the wireless power transmission from the wireless power transmission module.

17. The device of claim 16, wherein the wireless power transmission module is configured to wirelessly transmit power based upon one or more predetermined transmission policies.

18. The device of claim 17, wherein the one or more predetermined transmission policies are provided through a user interface associated with the device, and stored in a memory associated with the device.

19. The device of claim 17, wherein the one or more predetermined transmission policies include a first threshold for a remaining energy level at the power source to maintain the wireless power transmission, a second threshold related to a time duration for keeping the wireless power transmission module activated, an activation time instant of the wireless power transmission module, and an amount of power to be transmitted by the wireless power transmission module.

20. The device of claim 16, wherein the processor is configured to:

monitor one or more operational characteristics of the power source and the wireless power transmission module related to the one or more predetermined transmission policies, and stop the wireless power transmission based on a determination that the one or more monitored operational characteristics have violated at least one of the one or more predetermined transmission policies.

21. The device of claim 16, wherein the processor is configured to stop the wireless power transmission based on a determination that an unrecoverable error occurred at the device.

22. The device of claim 20, wherein, to stop the wireless transmission, the processor is configured to change a state of a Universal Serial Bus interface connection between the wireless power transmission module and the processor.

23. The device of claim 13, wherein the wireless power transmission module is further configured to monitor an energy level of the power source.

24. The device of claim 13, wherein the wireless power transmission module is further configured to periodically poll the processor to determine a current energy level of the power source, whether the power source is coupled to an AC power source, or both.

25. An apparatus, comprising:

an antenna configured to generate an electromagnetic field to transmit power wirelessly;

a power reception module adapted to be coupled with a power source of a computing device, and receive power therefrom during a plurality of operational states of the computing device including a powered-off state, wherein active power transmission from the computing device is controlled such that the active power transmission is terminated when a time duration during which the antenna is kept active for wireless power transmission exceeds a predetermined time duration threshold, and the active power transmission is terminated when a remaining power level of the power source is below a power level threshold;

wherein, a controller configured to terminate active power transmission based on a determination whether or not a control signal is detected on a Universal Serial Bus connection between the apparatus and the computing device; and a power processing module configured to process the received power, and energize the antenna in accordance with the processed power.

26. A method, comprising:

receiving, at a wireless power transmission module operatively associated to a computing device, power from a power source of the computing device during a plurality of operational states of the computing device including a powered-off state;

transmitting, from the wireless power transmission module, power wirelessly; and adjusting, at the wireless power transmission module, said transmitting power operation, said adjusting including terminating active power transmission by the wireless power transmission module when a time duration during which the wireless power transmission module is kept active exceeds a predetermined time duration threshold and terminating active power transmission by the wireless power transmission module when a remaining power level of the power source is below a power level threshold, wherein, terminating active power transmission includes determining whether or not a control signal is detected on a Universal Serial Bus connection between the wireless power transmission module and the computing device.

27. The method of claim 26, further comprising sending a polling signal from the wireless power transmission module to the computing device to determine a current energy level of the power source, whether the power source is coupled to an AC power source, or both.

28. The method of claim 27, said adjusting further comprising adjusting, at the wireless power transmission module, said transmitting power wirelessly operation, if the polling signal indicates that the current energy level of the power source is below a predetermined threshold and the power source is not coupled to the AC power source.

29. The method of claim 26, wherein said adjusting operation includes stopping said transmitting power wirelessly operation responsive to a determination that the time period has exceeded the predetermined time threshold.

30. The apparatus of claim 25, wherein the power processing module is further configured to adjust the power provided to the antenna in accordance with an adjustment signal received from the computing device.

\* \* \* \* \*